INVENTOR
RAYMOND M. WILMOTTE
BY
ATTORNEY

INVENTOR
RAYMOND M. WILMOTTE

BY

ATTORNEY

Patented Oct. 6, 1953

2,654,885

UNITED STATES PATENT OFFICE 2,654,885

MULTIPLEX FREQUENCY MODULATION COMMUNICATION SYSTEM

Raymond M. Wilmotte, Washington, D. C., assignor to Padevco, Inc., Washington, D. C., a corporation of Delaware Application December 19, 1949, Serial No. 133,872

18 Claims. (Cl. 343—200)

This application is related in subject matter to my copending application for U. S. Patent, entitled "FM Systems I," filed concurrently herewith, and identified as Serial No. 133,871.

The present invention relates generally to systems for the transmission of intelligence by modulation of radio frequency carriers, and more particularly to systems for simultaneous transmission of two co-channel frequency modulated signals, and for the separate reception of these signals at a remote location, without mutual interference therebetween.

It is a broad object of the present invention to provide a novel communication system.

It is a further broad object of the invention to provide a system for more efficiently utilizing radio frequency channels.

It is another object of the invention to provide a system for transmitting two frequency modulated signals in overlapping relation, and for separately demodulating the signals at a remote location, without mutual interference therebetween.

It is a further object of the invention to provide a novel system for the transmission of two modulation signals, wherein one of the signals is utilized to modulate a carrier in frequency, and wherein a further co-channel carrier or adjacent carrier is modulated in frequency simultaneously in response to both modulation signals, whereby the difference in the frequencies of the two co-channel carriers is representative of the second modulation signal.

It is another object of the present invention to provide a novel system of secrecy communication.

It is still a further object of the invention to provide a system of communication wherein two separate modulations are imposed, one on a first carrier as frequency modulation thereof, and both on a second carrier as frequency modulation thereof, the beat frequency between the two carriers being utilized at a remote receiver for deriving the second modulation signal.

It is still a further object of the invention to provide a system for transmitting two modulations on two co-channel frequency modulated carriers, and for utilizing the beat frequency between the carriers to demodulate both carriers and to derive both modulations therefrom, each without interference from the other.

The above and still further objects, features and advantages of the present invention will become apparent upon consideration of the following detailed disclosure of various embodiments thereof, especially when taken in conjunction with the accompanying drawings wherein.

Briefly described and in accordance with a first embodiment of the present invention, a first source of signal, denominated Signal A, is utilized to modulate a first oscillator in frequency, and the resultant frequency modulated wave is transmitted. Simultaneously, Signal A is added continuously to a second modulation signal, denominated Signal B, to provide a sum signal. The sum signal is then utilized to frequency modulate a second oscillator, the resultant frequency modulated carrier being transmitted simultaneously with the first. The two frequency modulated carriers may then be overlapping or co-channel, and nevertheless may be separately detected at a receiver.

In a further system, disclosed in an application filed concurrently herewith, and assigned Serial No. 133,871, entitled FM System I, I have shown how two modulations, corresponding with Signals A and B may be derived at a receiver, by developing a frequency corresponding with the beat frequency between the two carriers, demodulating this beat frequency, and accomplishing reversals of polarity of the demodulated signal in accordance with whether the second carrier is instantaneously greater or less in frequency than the first carrier, as determined by the character of the beat frequency. Since the beat frequency corresponds to the frequency difference between the two carriers, or has a frequency difference at each instant corresponding with modulation Signal $A+B-A$, the beat frequency signal is frequency modulated in accordance with the modulation of Signal B. In accordance with my prior system, it is essential at the receiver to provide circuits for determining whether the beat frequency signal at each instant eventuated from two carriers of different strength wherein the weaker was greater or less in frequency than the stronger, and this result was effected, in accordance with an exemplary method, by determining the relative frequencies of the peaks and troughs of the beat frequency of the superposed co-channel signals. In accordance with the present invention, on the other hand, a determination is made at the transmitter of the relative frequency values of the weaker and stronger carriers and a signal is transmitted to the receiver which is indicative of whether the weaker signal is greater in frequency or less in frequency than the stronger signal. This monitoring signal is then utilized at the receiver to effect the necessary phase reversals of the modulation representative of the Signal B.

Figures 1, 2:
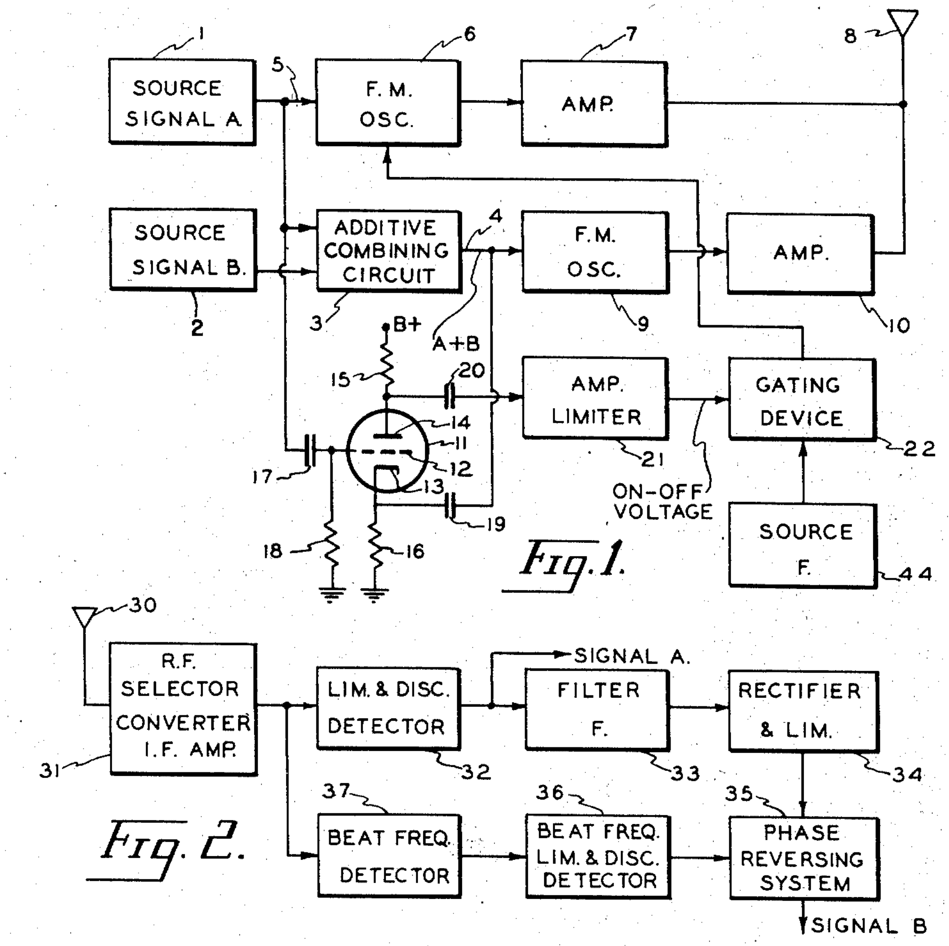
Figure 1 is a functional block diagram of a transmitter arranged in accordance with the present invention.
Figure 2 is a functional block diagram of a receiver arranged to demodulate the signals transmitted by the transmitter illustrated in Figure 1.

Referring now more specifically to the drawings, and particularly to Figure 1 thereof, there is illustrated a source 1 of Signal A and a further source 2 of Signal B. These signal sources may be independent, and if desired, one of the signal sources may be constituted of a masking signal for the other, which makes of the present system a secrecy system. On the other hand, two separate sources of information may be transmitted co-channel by the present system, if desired. The signals deriving from the source 1 and the signals deriving from the source 2 are applied to a combining circuit 3, which continually algebraically adds the amplitudes of the two signals, having regard for their polarity, so that at the output of the combining circuit 3, and on the line 4, is provided a modulation signal representative of the algebraic sum of the Signals A and B.

The Signal A derived from source 1 is applied via a line 5 to a frequency modulated oscillator 6, and serves to control frequency modulations thereof. The output of the frequency modulated oscillator 6 is amplified in an amplifier 7 and applied to an antenna 8 for radiation thereby.

Simultaneously the output of the combining circuit 3 is applied via the line 4 to a frequency modulated oscillator 9 and serves to modulate the frequency thereof in accordance with the amplitude of the modulated signal, in conventional fashion. The output of the frequency modulated oscillator 9 is applied to an amplifier 10 and the output of the latter is applied to antenna 8 for radiation thereby.

The amplifiers 7 and 10 are arranged in respect to the amplitudes of their outputs such that amplifier 10 provides a relatively weaker signal than does amplifier 7. Accordingly, the carrier which is modulated in accordance with the sum Signal $A+B$ is transmitted as a relatively weaker carrier, and the carrier provided by the amplifier 7, which carries modulations corresponding with the Signal A alone, is transmitted as a stronger signal.

It is preferred, in accordance with the present system, to transmit a monitoring signal representative of, or indicative of, whether at each instant the signals transmitted by amplifier 10 are greater or less in frequency deviation than those transmitted by amplifier 7. Since these frequency deviations are proportional to the amplitude variations which produce them, this is equivalent to stating that it is essential to transmit monitoring signals which are indicative of whether Signal A per se is greater or less in amplitude than Signal $A+B$, as it is provided at the output of combining circuit 3.

In order to generate the required monitoring signals I utilize a control tube 11 having a control electrode 12, a cathode 13 and an anode 14. The anode 14 is connected via a load resistance 15 to a source of B+ voltage, and the cathode 13 is connected via a cathode load resistance 16 to ground. The source of Signal A represented by the block 1 is coupled via a coupling condenser 17, and over a grid leak 18, to the control electrode 12 of the tube 11, while the output of the combining circuit 3 is applied via a coupling condenser 19 to the cathode 13. The bias of the tube 11 is arranged so that in the absence of signal applied either to the cathode or the control electrode thereof, the tube is substantially at cut-off, and a predetermined voltage is accordingly established at the anode 14 thereof. In the presence of signals applied simultaneously to the control electrode 12 and to the cathode 13, if the signal provided by source 1 be more positive than that provided by combining circuit 3, the control electrode 12 will go positive with respect to the cathode 13 and the tube 11 will pass current, resulting in a decrease in anode voltage at the anode 14. On the other hand, if at any time the signal applied to the control electrode 12 is less positive than that applied to the cathode 13 by the output of the combining circuit 3, the tube will remain at cut-off and no variation in output thereof at the anode 14 will be reflected.

Variations in anode voltage at the anode 14 are passed via blocking condenser 20 to an amplitude limiter 21 which is arranged to pass to gating device 22 an "on" gating voltage, in response to each decrease of voltage at the anode 14, and no "on" gating voltage, which is equivalent to an "off" gating voltage, while the anode 14 has a potential corresponding with cut-off current for the tube 11. Accordingly, the gating device 22 is turned on to pass current therethrough whenever the Signal A exceeds the output of the combining circuit 3, or exceeds the sum of the Signals $A+B$. It will be evident, upon slight consideration, that this is equivalent to stating that the gating device 22 is turned on whenever the algebraic sign of B is positive and is turned off whenever the algebraic sign of B is negative.

Connected to the input of the gating device 22 is a source of Signal F, which may correspond with a continuous frequency lying outside the range of the modulation signals provided by signal sources 1 and 2, or by combining circuit 3. For example, if audio signals are to be transmitted by the present system, we may assume these signals to extend over the range 60 to 5000 cycles, and in this event the source F may be at a frequency of 10,000 cycles. The output of the gating device 22 is applied to the input of the frequency modulated oscillator 6, and accordingly is radiated as a frequency modulation of carrier representative of Signal A, as a supplementary modulation thereof.

Turning now to Figure 2 of the accompanying drawings, the carriers radiated by the antenna 8, which are co-channel, and the stronger of which is representative of Signal A, while the weaker is representative of Signal $A+B$, are received on an antenna 30 and passed thereby to a radio frequency selector, a converter, and an intermediate frequency amplifier, represented by the block 31. These elements are arranged and operate in accordance with the common practice in superheterodyne receivers, and accordingly require no extended discussion in the present specification.

The output of the I. F. amplifier of 31 is applied to a limiter and discriminator-detector 32, which derives at its output the modulation signal corresponding with Signal A, for the reason that limiter-discriminators, when two co-channel signals of substantially and sufficiently different amplitudes are applied thereto, substantially ignore the presence of the weaker signal, and provide an output corresponding with modulations of the stronger of the two signals. Additionally, at the output of the limiter and discriminator 32 is provided a filter 33, which separates out the signal F. This output, at frequency F, is then applied to a detector and limiter 34, which rectifies the output of the filter 33, and which limits the amplitude of the rectified signal to a predetermined constant value suitable for use for controlling a phase reversing system 35. The latter has applied thereto a signal provided by a beat frequency limiter and discriminator 36, the input of which is derived from a beat frequency detector 37 connected to the I. F. amplifier of block 31. The beat frequency provided by the beat frequency limiter and discriminator 36 is representative of Signal B, since the frequency of the input to the beat frequency limiter and discriminator corresponds with the difference between frequency modulated carrier carrying modulation A and the frequency modulated carrier carrying modulation $A+B$. The beat frequency representative of the difference between the two frequencies is then representative of $A+B-A$, or of B. This beat frequency being limited and discriminated in the beat frequency limiter and discriminator 36, corresponds with Signal B. However, as will be realized upon consideration of the circuits involved, the output of the discriminator beat frequency limiter and discriminator 36 does not have a polarity representative of the polarity of Signal B, since the beat frequency detector 37 provides the same output whether B is algebraically positive or negative, i. e., it provides a frequency which is representative of the absolute magnitude of B, without taking account of its polarity. However, the proper polarity reversals of the Signal B, as it derives from the beat frequency limiter and discriminator 36 may be accomplished in phase reverser 35, by controlling the phase reversal action thereof in response to the output of the detector and limiter 34. This may be accomplished, generically, by causing a phase reversal of the output of beat frequency limiter and discriminator 36 whenever source F is passed by the gating tubes 22 at the transmitter of Figure 1, and may be accomplished practically by controlling the phase reversing action of the phase reverser 35 in response to the output of the detector and limiter 34. Accordingly at the output of the phase reversing system 35 is provided the Signal B, and Signal B as provided is at all times of proper amplitude and proper polarity to represent the Signal B, as provided by the source 2 at the transmitter of Figure 1.

Figure 3:
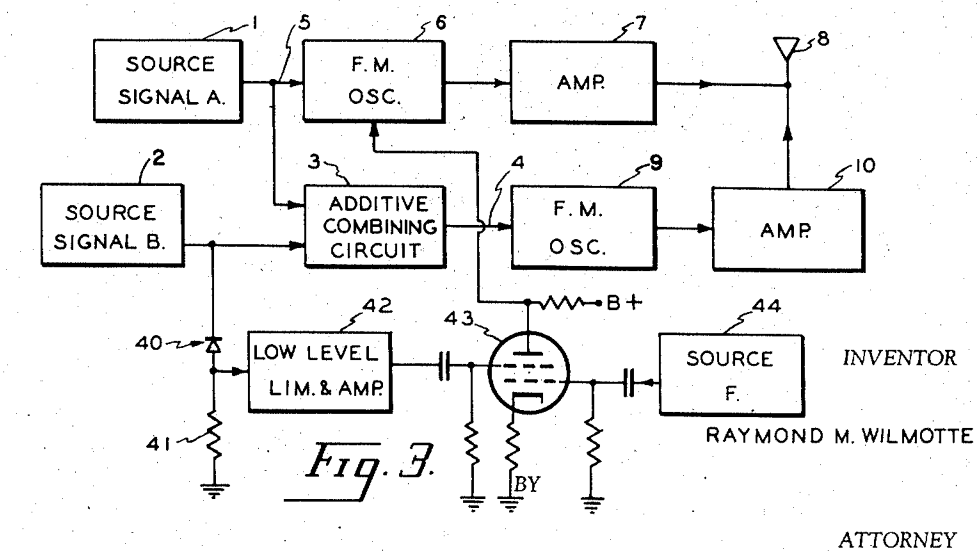
Figure 3 is a functional block diagram of a modification of the transmitter illustrated in Figure 1.

Reference is now made to Figure 3 of the accompanying drawings, which illustrates a transmitter system which may be utilized in place of the transmitter system of Figure 1 of the accompanying drawings, and which is adapted to cooperate with the receiver illustrated in Figure 2 of the accompanying drawings. The system of Figure 3 is identical with the system of Figure 1 except in respect to the mode of deriving the monitoring signals. In the system of Figure 2 the monitoring signal is derived in response to a comparison of the amplitudes of the output of signal source 1 and of combining circuit 3. In the system of Figure 3, on the other hand, the monitoring signal is derived in response to a measurement made on Signal B alone, to determine the polarity thereof. If the polarity is positive, then Signal $A+B$ must be greater than Signal A, while if it is negative Signal $A+B$ must be less than Signal A. Accordingly, a comparison of the amplitudes of the signals outputs of source 1 and combining circuit 3 is not essential to the practice of the invention, but the same results may be accomplished by an examination of the polarity of Signal B at each instant of time.

The corresponding elements in Figures 1 and 3 have been identified by identical numerals of reference, and a detailed description of the operation of the system of Figure 3 is dispensed with, to avoid redundancy. In Figure 3 the output of signal source B is applied to a rectifier 40, which is poled to reject completely the output of signal source 2 when the latter is positive, and to pass the signal to a resistance 41 when the signal is negative. The voltage across resistance 41 accordingly is zero while signal source B is positive and represents Signal B, in amplitude, when the latter is negative. The voltage developed across resistance 41 is applied to an amplitude limiter and amplifier 42, which operates at low levels, and which supplies an output voltage of definite amplitude and polarity, so long as signal exists across resistance 41 in appreciable amount. There is output from limiter and amplifier 42, accordingly, so long as Signal B is negative. The output of limiter 42 is applied to gating tube 43 for turning the latter on in response to the gating voltage, the gating tube 43 being normally turned off. A source of Signal F, represented by block 44, is applied to the input of gating tube 43, so that Signal F is passed by the gating tube 43, and may be applied to the input of frequency modulator 9, whenever Signal B is negative. Signal F may then be derived at the receiver of Figure 2, and utilized for controlling the phase of the output of beat frequency limiter and discriminator 36, just as if the signals received by the receiver of Figure 2 had originated in the transmitter of Figure 1.

Figures 4, 5:
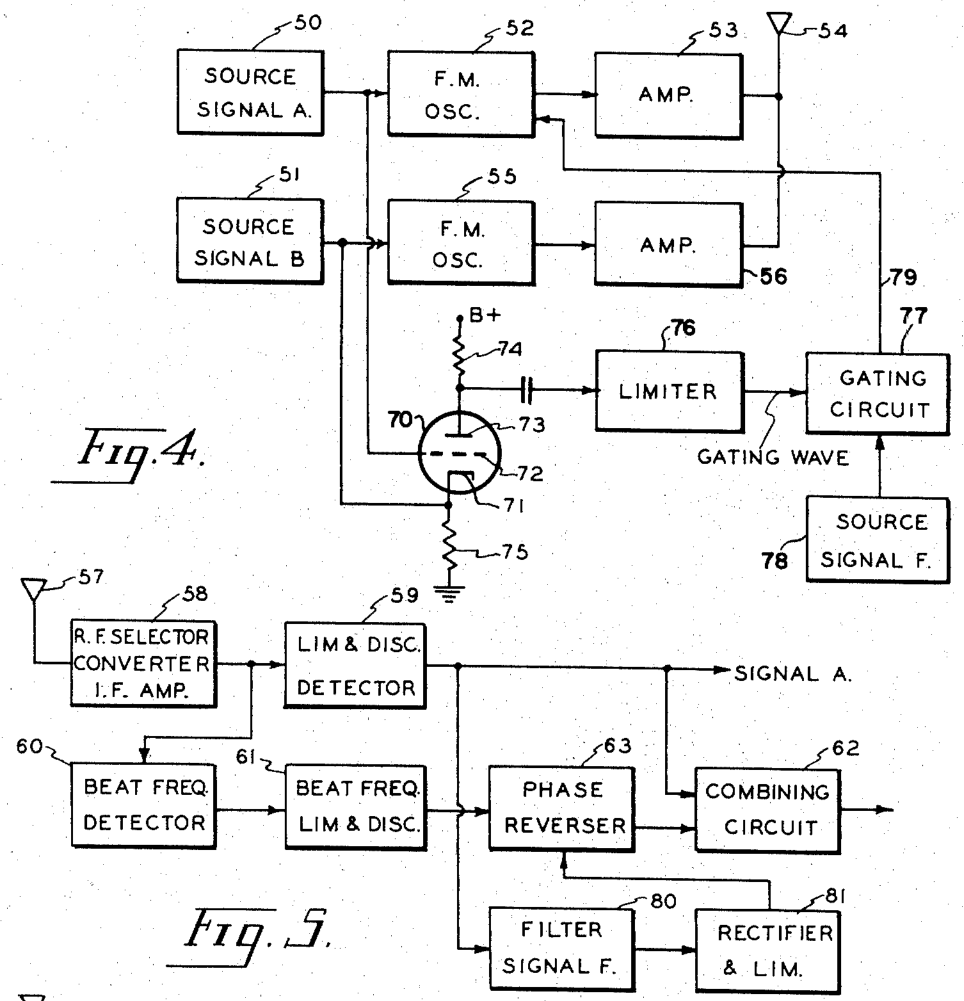
Figure 4 is a functional block diagram of a further transmitter arranged in accordance with the present invention.
Figure 5 is a functional block diagram of a receiver for receiving and demodulating the signals transmitted by the transmitter of Figure 4; and, Figure 6 is a functional block diagram illustrating a modification of the receiver of Figure 5.

Reference is now made to Figures 4 and 5 of the drawings, wherein are illustrated respectively a transmitter and a receiver for transmitting and receiving on two co-channel carriers, and as frequency modulations of those carriers, two discrete signals, the receiver being capable of separating the modulations of the two signals, and presenting them independently of one another and without mutual interference from one another.

In Figure 4 reference numeral 50 represents a source of Signal A, while the reference numeral 51 identifies a source of Signal B, Signals A and B being respectively audio signals, for example, which have no necessary relation one to another.

Signal A, as supplied by the source 1, is applied to a frequency modulated oscillator 52 and controls the frequency modulations thereof. The output of frequency modulator oscillator 52 is amplified in a high level amplifier 53 and transmitted over an antenna 54.

Similarly Signal B, as provided by source 51, is applied to a frequency modulated oscillator 55 for controlling the frequency modulations thereof, and the output of frequency modulated oscillator 55 are applied to a low level amplifier 56 for suitable amplification, the output of the amplifier 56 being applied to the antenna 54 for radiation therefrom. The signals provided by the antenna 54 are received on an antenna 57, at some remote location, and applied to a radio frequency selector, a converter and an intermediate frequency amplifier, 58, in a manner which is conventional per se in the art of receiving radio signals by means of superheterodyne receivers. The output of the I. F. amplifier is applied to a limiter and discriminator 59, which provides at its output the Signal A, since the latter is stronger than the Signal B, and since it is an inherent property of limiters and discriminators, which is well understood in the art, that upon application thereto of two co-channel signals, one of which is sufficiently stronger than the other, the output of the stronger signal will be demodulated while the weaker signal will be suppressed, substantially. In the present system sufficient difference of amplitude is established between the transmitted carriers by adjustment of the output level of the high level amplifier 53 in relation to the output level of the low level amplifier 56, at the transmitting station of Figure 5 of the drawings.

The I. F. amplifier of block 58 further provides its co-channel ouput signals to a beat frequency detector 60, which provides at its output the beat frequency between the two carriers A and B, so denominated because they carry respectively modulations representative of Signal A and Signal B, respectively. The output of beat frequency detector 60, which represents then the difference in frequency at each instant of carrier A and carrier B, is applied to a beat frequency limiter and discriminator 61, which provides at its output an amplitude varying signal having at each instant an amplitude representative of the frequency of the beat frequency provided by the beat frequency detector 60, except in one respect, and that is that since the beat frequency detector 60 is incapable of determining whether the beat frequency detected thereby results from a carrier A which is greater or less than carrier B, the output of beat frequency limiter and discriminator 61 does not contain any indication of the polarity of the difference between Signals A and B. The output of beat frequency limiter and discriminator 61 is to be added to the output of limiter and discriminator 59. The latter represents Signal A and since the output of beat frequency limiter and discriminator 61 represents either $A-B$ or $B-A$ the sum of the two will represent Signal B provided the phase is properly selected. The combination of Signal A with the output of beat frequency limiter and discriminator 61 accordingly takes place in a combining circuit 62, after suitable phase reversals have taken place in a phase reversal system 63, which is responsive to reverse the phase of the output of beat frequency limiter and discriminator 61 in accordance with whether an addition or a subtraction is essential.

Referring now again to the transmitter illustrated in Figure 4 of the drawings, there is provided a triode 70, having a cathode 71, a control electrode 72, and an anode 73. The anode 73 is connected via a load resistor 74 to a source of B+ potential, while the cathode is connected via a cathode load resistance 75 to ground. The bias of the triode 70 is so selected that the tube is normally substantially at cut-off.

Signal A, as derived from source 50, is applied to control electrode 72, while Signal B, as derived from source 51, is applied to cathode 71. Since tube 70 is normally at cut-off, the tube will be raised beyond cut-off, or constrained to pass substantial current, only while Signal A is greater than Signal B, since only at such times will the control electrode 72 be more positive than cathode 71 by an amount which is sufficient to bias the tube beyond cut-off. At all other times, the tube remains cut-off. A limiter 76 is connected to the anode 73, and serves to limit voltage variations occurring at the anode. So long as Signal B is less than Signal A no variation occurs at the anode and limiter 76 provides no output signal. When Signal B becomes less than Signal A the voltage at anode 73 drops, and there is accordingly provided a signal at the input of limiter 76. Limiter 76 clips this signal to establish a constant output voltage for application to a normally blocked gater 77, this voltage being adequate to turn the gater on.

Connected to the input of gater 77 is a source of monitoring signal 78, which may have some suitable frequency falling outside the audible range or, in other words, one which is readily distinguishable from any signal provided by source 50 or 51. For example, if the system is utilized for speech transmission, it may be assumed that the total frequency spectrum contained in Signals A and B does not extend beyond 5000 cycles. In such case, monitoring Signal F may be established at approximately 10,000 cycles.

The output of gater 77 is connected to the input of frequency modulated oscillator 52 via lead 79. Accordingly, the monitoring Signal F is transmitted together with Signal A when Signal A is greater in amplitude than Signal B and is not so transmitted otherwise.

Referring now to the receiver illustrated in Figure 5 of the accompanying drawings, a filter 80 is provided, connected to the output of limiter and discriminator 59, and which is tuned to pass only the Signal F. The output of filter 80 is applied to a detector and limiter 81, which provides a level D.-C. output of constant amplitude whenever Signal F is being passed by filter 80, or, otherwise expressed, whenever Signal A is greater in amplitude than Signal B. The output of detector and limiter 81 is applied to phase reversal system 63 to control phase reversals thereof, and to effect a phase reversal of the output of beat frequency limiter and discriminator 61 whenever Signal F is received at the receiving system. Accordingly, the output of beat frequency limiter and discriminator is applied to combining circuit 62 in such phase as to subtract from Signal A in the presence of monitoring Signal F and to add thereto in the absence of monitoring Signal F. Thereby the difference frequency $A-B$ or $B-A$ is so selected as properly to combine with Signal A to provide at the output of algebraically adding combining circuits 62 the Signal B.

Figure 6:
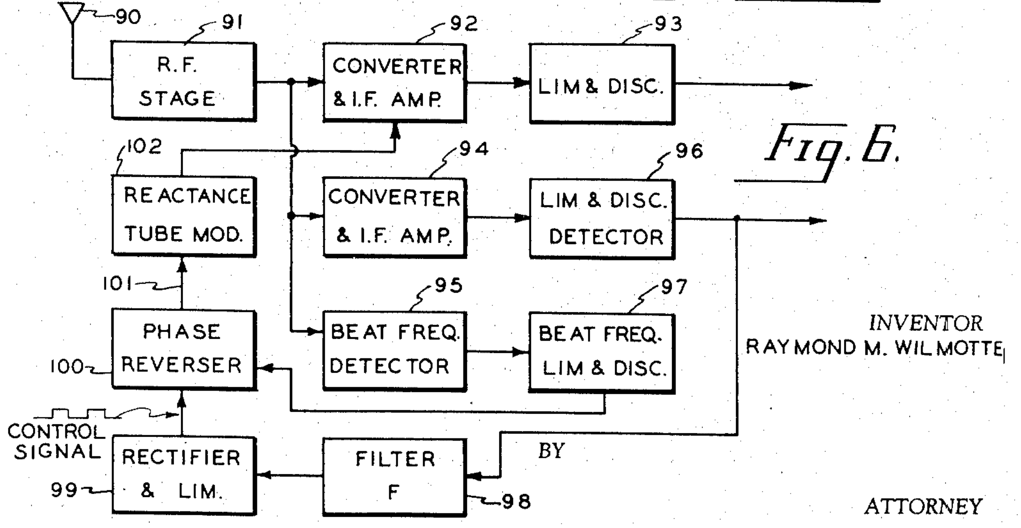

Reference is now made to Figure 6 of the accompanying drawings, wherein is illustrated a modification of the receiver system of Figure 5, which is capable of operating in conjunction with the transmitter of Figure 4 of the accompanying drawings.

In Figure 6 of the drawings carriers A and B are received on an antenna 90, which applies these signals to an R. F. stage 91, the latter applying the carriers A and B to a converter and intermediate frequency amplifier 92, which, in turn, and after suitable frequency conversion and amplification, applies the signals to a limiter and discriminator 93. Similarly the output of R. F. stage 91 is applied, in parallel, to a further converter and intermediate frequency amplifier 94, and to a beat frequency detector 95. The output of converter and intermediate frequency amplifier 94 is applied to a limiter and discriminator 96, which provides at its output Signal A, since it has been assumed that carrier A is of sufficiently greater amplitude, as received at the antenna 90, and with respect to carrier B, that the limiter and discriminator 96, in accordance with its normal law of operation, discriminates against the modulations representative of Signal B, and passes only those representative of Signal A.

The output of beat frequency detector 95 is applied to a beat frequency limiter and discriminator 97. Since the ouput of beat frequency detector 95 represents the difference in frequency between carrier A and carrier B, without regard to the sign of the latter, or, without regard to whether carrier A is instantaneously greater or less in frequency than carrier B, the output of beat frequency limiter and discriminator 96 represents an amplitude modulated voltage of one polarity only, and representative only of the numerical difference between carriers.

It will be recalled that at the transmitter of Figure 4 of the drawings, a monitoring Signal F is transmitted whenever Signal A is greater in amplitude than Signal B, and accordingly the monitoring signal is received and may be derived from the output of limiter and discriminator 96 by means of a filter 98, and detected and limited in a detector and limiter 99, to provide a D.-C. signal whenever carrier A is greater in frequency than carrier B, but not otherwise.

The output of detector and limiter 99 is applied to control a phase reverser 100, to the input of which is applied the output signal from beat frequency limiter and discriminator 97. This output is sometimes of proper polarity and at other times of reverse polarity, for the further operation of the system. The action of phase reversal system 100 serves to reverse the polarity of the output of beat frequency limiter and discriminator at the proper times to provide at the output of phase reversal system 100 an alternating voltage, representative in both amplitude and polarity of the difference between carrier A and carrier B. This voltage is applied via lead 101 to reactance tube 102, which controls the oscillator of the converter and I.F. amplifier 92. The sense in which this control is accomplished is such as to subtract from the frequency A, a frequency representative of the difference in frequency between carriers A and B. The output of converter and I.F. amplifier 92 now represents the difference between carriers A and B added to carrier A, the addition being carried out algebraically in suitable sense to accomplish an input frequency to the limiter and discriminator 93 which has frequency variations representative of Signal B alone, but which has an amplitude corresponding with the amplitude of Signal A, the larger of the signals. Accordingly, the output of limiter and discriminator 93 corresponds with Signal B, and contains substantially no components representative of Signal A.

While I have disclosed the present invention as applied particularly to co-channel signals, it will be clear that it may be applied to signals in channels which merely overlap in some degree or in non-overlapping or adjacent channels, if desired.

It will further be clear that while I have disclosed the present system as one employing a sensing signal in the nature of a continuous super-audible tone impressed as modulation on the stronger of two co-channel carriers, that the tone may be impressed on the weaker carrier, or transmitted on an independent additional carrier, or that a plurality of tones may be employed, one or more on one of the carriers, and the other one or more on the other of the carriers. It will further be clear that in place of tone signals, other types of signals may be transmitted to indicate when phase reversals are to take place, as for example short pulse signals of various character transmitted at the precise instant when phase reversal is required. It is an essential feature of the present invention to transmit a signal or signals of some character to control phase reversals at the receivers of the system, but the specific character of these signals and the mode in which they are transmitted and segregated, after being received, from the intelligence transmitted in the system, is not of the essence of the invention, and is subject to considerable variation and modification without departing from the true scope of the invention.

The beat frequency detector and beat frequency limiter and discriminator, illustrated herein at 37, 36, in Figure 2, at 60, 61 in Figure 5, and at 95, 97 in Figure 6, of the accompanying drawings, may correspond in circuit detail, and when taken together, to the beat frequency detector and discriminator 4 of my concurrently filed application for U. S. patent entitled "FM System I." In general, any techniques there described for beat frequency detection and discrimination may be utilized herein.

While I have described various specific embodiments of the present invention, it will be clear that variations thereof may be resorted to without departing from the true spirit and scope thereof.

What I claim and desire to secure by Letters Patent of the United States is:

1. A communication system, comprising, a first frequency modulation transmitter for continuously transmitting a first signal, a second co-channel frequency modulation transmitter for continuously transmitting a second signal, means connected with one of said transmitters for transmitting a monitoring signal only while said first signal is greater in amplitude than said second signal, and means responsive to said monitoring signal for separately detecting said first and second signals each without interference from the other.

2. In combination, a source of first modulation, a source of second modulation, means for combining said first and second modulations to provide a third modulation equal in amplitude at each instant to the algebraic sum of the amplitudes of said first and second modulations, a first source of carrier signal, a second source of carrier signal, means for frequency modulating said first carrier signal in response to said first modulation, means for frequency modulating said second carrier signal in response to said third modulation, means for generating a monitoring signal representative of the instantaneous relative magnitudes of said first and third modulations, and means for modulating one of said carrier signals in response to said monitoring signal.

3. In combination, a source of first modulation, a source of second modulation, a source of first carrier, a source of second carrier co-channel with said first carrier, means responsive to said first modulation for frequency modulating said first carrier, means responsive to said second modulation for frequency modulating said second carrier, means for generating a monitoring signal only while said first modulation is greater in absolute magnitude than said second modulation, and means for modulating one of said carriers in response to said monitoring signal.

4. The combination in accordance with claim 3, wherein said first modulation and said second modulation are distinct modulations.

5. The combination in accordance with claim 3 wherein said first carrier is greater in amplitude than said second carrier.

6. The combination in accordance with claim 3 wherein one of said modulations is at all instants the algebraic sum of the other of said modulations and a further modulation.

7. In a frequency modulation communication system, means for transmitting a first frequency modulated carrier of a first amplitude, means for transmitting a second co-channel frequency modulated carrier of substantially smaller amplitude, means for modulating said first carrier with a monitoring signal indicative of the relative frequencies of said carriers, a receiving system for said co-channel carriers, means for deriving from said receiving system said monitoring signal, means for deriving the beat frequency between said carriers, and means responsive to said beat frequency and to said monitoring signal for deriving the modulation of the weaker of said carriers.

8. In a frequency modulation communication system, a first modulation source, means for transmitting a first frequency modulated carrier of a first amplitude in response to said first modulation source, a second modulation source, means for transmitting a second co-channel frequency modulated carrier of substantially smaller amplitude in response jointly to said first and second modulation sources, means for generating a monitoring signal wherever the frequency of a predetermined one of said carrier exceeds that of the other of said carriers, means for transmitting said monitoring signal to a remote location, and means at said remote location responsive to said monitoring signal and to said carriers for deriving a modulation signal substantially duplicating said second modulation.

9. In a frequency modulation communication system, a source of first modulation, means for transmitting a first frequency modulated carrier of predetermined amplitude in response to said first modulation, a source of second modulation, means for transmitting a second co-channel frequency modulated carrier of amplitude less than said predetermined amplitude in response to said second modulation, means for transmitting a monitoring signal to a remote location whenever the frequency of a predetermined one of said carriers exceeds the frequency of the other, and means at said remote location responsive to said monitoring signal and to said carriers for deriving a modulation signal substantially duplicating said second modulation.

10. The combination in accordance with claim 9 wherein said last means comprises means for detecting the beat frequency between said carriers, means for frequency demodulating said beat frequency to derive auxiliary modulation, means for controlling the phase of said auxiliary modulation in accordance with said monitoring signal to provide additional auxiliary modulation, and means responsive to said additional auxiliary modulation and said first frequency modulated carrier for deriving said second modulation.

11. In a communication system wherein one of a pair of co-channel frequency modulated carriers is modulated in response to a first modulation, and wherein the second of said pair of co-channel carriers is modulated in response to a second modulation, and wherein a monitoring signal is transmitted whenever a predetermined one of said carriers exceeds the other of said carriers in absolute frequency, the combination of a receiver for receiving said co-channel carriers, said receiver comprising means for deriving said modulations from said carriers, and means for determining the polarity of at least one of said modulations under control of said monitoring signal.

12. In a communication system wherein one of a pair of co-channel frequency modulated carriers is modulated in response to a first modulation, and wherein the second of said pair of co-channel carriers is modulated in response to said first modulation and a second modulation jointly, and wherein a monitoring signal is transmitted whenever a predetermined one of said carriers exceeds the other of said carriers in absolute frequency, the combination of a receiver for receiving said co-channel carriers, said receiver comprising means for frequency demodulating the beat frequency between said carriers and deriving an auxiliary modulation, and means for determining the polarity of said auxiliary modulation under control of said monitoring signal.

13. A communication system, comprising, a first frequency modulation transmitter for transmitting a first frequency modulated carrier the frequency modulations of which correspond with first alternating current signals, a second co-channel frequency modulation transmitter for transmitting a second frequency modulated carrier the frequency modulations of which correspond with an algebraic sum of said first alternating current signals and additional alternating current signals, means for transmitting a sensing signal representative of relative values of instantaneous magnitude of said first and additional alternating current signals, and means responsive to said carriers and to said sensing signals for reproducing said additional alternating current signals.

14. A communication system, comprising, means for transmitting a first carrier modulated in frequency with a first alternating current signal, means for transmitting a second carrier modulated in frequency with a second alternating current signal, said second alternating current signal having instantaneous values equal to the instantaneous algebraic sum of said first alternating current signal and a third alternating current signal, and means for transmitting a sensing signal having an information bearing characteristic representative of the relative values of said first and second alternating current signals.

15. A system in accordance with claim 14 wherein is further provided means for receiving said first and second carriers and said sensing signals, and means responsive to said first and second carriers and to said sensing signal when received for reproducing said third alternating current signal.

16. A system in accordance with claim 15 wherein said sensing signal is transmitted as a modulation of one of said carriers.

17. A communication system, comprising, means for transmitting a first carrier modulated in frequency with a first alternating current signal, means for transmitting a second carrier modulated in frequency with a second alternating current signal, said second alternating current signal having instantaneous values equal to the instantaneous algebraic sum of said first alternating current signal and a third alternating current signal, and means for transmitting a sensing signal having an information bearing characteristic representative of the phase of said third alternating current signal.

18. A communication system in accordance with claim 17 wherein is further provided means for receiving said carriers and said sensing signal, means for deriving a fourth signal from said carriers, said fourth signal having instantaneous magnitudes proportional to the instantaneous magnitudes of said third alternating current signal and having phase which differs at random from the phase of said third alternating current signal, and means responsive to said sensing signal for deriving said third alternating current signal from said fourth signal.

RAYMOND M. WILMOTTE.

References Cited in the file of this patent

UNITED STATES PATENTS

| Number | Name | Date |
|---|---|---|
| 1,796,030 | Kell | Mar. 10, 1931 |
| 2,298,409 | Peterson | Oct. 13, 1942 |
| 2,379,720 | Koch | July 3, 1945 |
| 2,410,350 | Labin et al. | Oct. 29, 1946 |
| 2,418,119 | Hansen | Apr. 1, 1947 |
| 2,463,503 | Atkins | Mar. 8, 1949 |
| 2,463,505 | Atkins | Mar. 8, 1949 |

FOREIGN PATENTS

| Number | Country | Date |
|---|---|---|
| 562,915 | Great Britain | July 21, 1944 |